US006042946A

United States Patent [19]

Massie, II et al.

[11] Patent Number: 6,042,946

[45] Date of Patent: Mar. 28, 2000

[54] POLYURETHANE ROLLER WITH HIGH SURFACE RESISTANCE

[75] Inventors: Johnny Dale Massie, II, Lexington, Ky.; Angela Rachele Perruzza, Westminster; Edward Wayne Weidert, Superior, both of Colo.

[73] Assignee: Lexmark International, Inc., Lexington, Ky.

[21] Appl. No.: 09/124,695

[22] Filed: Jul. 29, 1998

[51] Int. Cl.[7] ........................ B32B 27/40

[52] U.S. Cl. .................. 428/423.1; 428/36.9; 428/36.91; 428/425.8; 430/110; 492/56; 492/59; 524/410; 524/430; 524/434; 524/435; 524/495; 524/496; 524/507

[58] Field of Search ................ 428/36.9, 36.91, 428/423.1, 425.8; 430/110; 492/56, 59; 524/410, 430, 434, 435, 495, 496, 507

[56] References Cited

U.S. PATENT DOCUMENTS 5,707,743 1/1998 Janes et al. .......................... 428/423.1

*Primary Examiner*—D. S. Nakarani
*Attorney, Agent, or Firm*—John A. Brady

[57] ABSTRACT

A charge roller made from a mixture of urethane, polybutadiene, a polyether diol, ferric chloride, and antimony doped tin oxide with or without carbon black. The roller has a very high outer surface electrical resistance from baking the roller to oxidize the polybutadiene. The charge roller is achieved at low production cost and functions well even with charging by a DC potential with an AC overlay.

32 Claims, No Drawings

POLYURETHANE ROLLER WITH HIGH SURFACE RESISTANCE

TECHNICAL FIELD

This invention relates to rollers used in electrophotography, and, more specifically, to an electrically conductive roller having a surface with a high electrical resistivity particularly suitable as a charge roller.

BACKGROUND OF THE INVENTION

A functional roller for use in electrophotographic printing often requires an outer surface layer of high electrical resistivity over a core of controlled electrical conductivity. U.S. Pat. No. 5,707,743; which is prior art to this invention; describes such a roller and a process of manufacture in which polybutadiene is incorporated in the materials of the core and the core is then baked to oxidize the polybutadiene at the surface of the core, resulting in a resistive surface on the core.

The embodiments of the foregoing U.S. Pat. No. 5,707,743 were for developer roller applications. A developer roller contacts a photoconductive surface and delivers toner to the photoconductive surface. This invention is for a modification of such developer roller embodiments to decrease the resistivity of the core and decrease the hardness of the final roller. Such a roller is consistent with being a developer roller, but the specific embodiment of this specification is a charge roller. A charge roller contacts a photoconductive member and is imparted with a high voltage, which thereby transfers an electrical potential to the photoconductive member. This voltage to the charge roller is typically an AC voltage overlayed onto a DC voltage, the peak AC voltage at least twice the DC being considered optimum for operation. This is a function which may be achieved by a corona discharge device and other known techniques, but contact charging, as with a charge roller, has the special advantage of creating minimal collateral discharges which can degrade the environment.

In accordance with this invention fillers are added to lower the electrical resistivity of the core. A polyether diol is added to lower the hardness and lower the resistivity of the core.

DISCLOSURE OF THE INVENTION

The roller of this invention is a cast or otherwise molded, electrically conductive polymeric roller with a surface layer of high electrical resistivity. This roller mimics the electrical properties of a coated roller. The roller is composed of a polydiene, such as a polyisoprene or more specifically polybutadiene, with a polyurethane prepolymer, a trifunctional polyether polyol, a particulate filler such as ferric chloride which is both a conductive additive and a catalyst, a second conductive additive, and a polyether diol. The bulk resistivity of the roller is low relative to typical urethane values. The surface of the cured roller is oxidized to produce a surface layer of material with high electrical resistivity. The surface of this oxidized roller is very resistive. The cost of production is low compared to adding one or more separate outer layers. Charge rollers of this invention charge well in low temperature and low humidity environments when a DC potential with an AC overlay is applied to them as their voltage source, which corresponds to the functioning of a resistively coated charge roller. Single resistivity charge rollers generally perform well in low temperature and low humidity environments only when a DC only voltage is applied.

DESCRIPTION OF THE PREFERRED EMBODIMENTS

Using the combination of materials described in this specification, a cast urethane roller having a resistive surface layer is produced by baking in air at elevated temperature. The oxidation of polybutadiene, in the presence of ferric chloride, produces a highly resistive layer at the surface, while a linear difunctional polyol, as well as the addition of conductive fillers in addition to ferric chloride, provide desired hardness and conductivity to the body of the roller.

Polycaprolactone urethane prepolymer, such as Vibrathane 6060 (trademark product of Uniroyal Chemical) is the urethane employed because of its stable electrical resistivity with temperature and humidity changes. Vibrathane 6060 is a polycaprolactone ester toluene-diisocyante prepolymer. Ferric chloride, tin oxide doped with antimony, and/or carbon black reduce electrical resistivity of the roller core to less than 1E7 (1 times 10 to the 7th power) ohm-cm. The combination of polycaprolactone urethane, polyether triol, polyether diol, ferric chloride, doped tin oxide and/or carbon black produces a roller with a single low resistivity from the roll surface to the center. In order to produce a roller with a high resistivity surface layer, a polydiene such as polybutadiene must be included in the formulation.

Polybutadiene can be added in either prepolymer or diol form. The polycaprolactone urethane can be cured by using a combination of polybutadiene diol with a polyether triol curative, such as Simusol TOIE, a product of SEPPIC, Inc. (Simusol TOIE is a different trademarked product but believed essentially chemically identical to Voranol 234-630 (trademark product of Dow Chemical Co., Inc.) used in embodiments of the foregoing U.S. Pat. No. 5,707,743.) The polybutadiene diol acts as a polymer chain extender for the urethane, as does Poly-G 55-37 (trademark product of Olin Corp.), a high molecular weight polyether diol (number average molecular weight 3000). The Poly-G 55-37 softens the resulting material as the relative amount in the mixture is increased.

The use of a hydrolytic stabilizer is required to maintain the roller physical and electrical properties over a long period of time and at various environment conditions. The addition if TIPA (trademark of Dow Chemical Co.) (chemically, triisopropanolamine) acts to hydrolytically stabilize the described urethane-based developer roll. In addition, 2,6-di-tert-butyl-p-cresol (Naugard BHT: trademark product of Uniroyal Chemical) or other antioxidant material should be added to the materials to control oxidated aging. Typical amounts will vary. However, 3000 ppm (parts per million) has been shown to be effective for this purpose.

The urethane formulation is then cast into a mold around a central, metal shaft and then cured at approximately 93 degrees C. for up to one hour using a combination of curing in a mold and out of mold to produce a rubber roller. The roller is then ground to the correct dimension. This roller does not have a resistive layer on the surface. The resistive layer is produced by baking the ground roller in air at an elevated temperature for some length of time. This baking procedure oxidizes the polybutadiene. The polybutadiene is highly unsaturated (60% trans 1,4; 20% cis 1,4; and 20% 1,2-vinyl structure) which makes it very susceptible to oxidation. The presence of ferric chloride is necessary to catalyze the oxidation process. Alternative ionic salts which do catalyze this oxidation process are ferrous chloride, calcium chloride and cobalt hexafluoroacetylacetonate.

The oxidation of polybutadiene in the presence of ferric chloride produces a highly resistive surface layer. The thickness and electrical resistivity of this surface layer can be controlled by varying the concentration of ferric chloride, the concentration of polybutadiene, the baking temperature, the concentration of oxygen and the baking time. For a roller to be used as a charge roller, these parameters preferably are altered to optimize the characteristics of the roller for the specific applied voltage.

EXAMPLE 1

The following formula is processed as described below.

1) Preheat at 75° C. : Vibrathane 6060, poly bd R-45HT, poly-G 55-37 and TIPA
2) Preheat a roller mold at 93° C. (200° F.); may require application of mold release for demolding
3) Mix solution of $FeCl_3$ and Simulsol TOIE with low heat and stirring
4) Degas the V6060 thoroughly; degas the polyol/$FeCl_3$ mix and the poly bd R45HT
5) Add a shaft to the mold and preheat at 93° C. for ~10 minutes
6) Carefully mix as follows:
   combine V6060, poly bd R-45HT poly-G 55-37 and $SnO_2$ then mix;
   add the polyol/$FeCl_3$ mix, TIPA then mix and fill mold
   Note: mixing is done by using a pneumatic mixer with care to avoid
   aeration materials during mixing to minimize bubble formation
7) Cure at 93° C.
8) Check curing after 15–20 minutes and demold when hardness is reasonably firm to the touch (record time)
9) Postcure at 93° C. for 1.5 hours to oxidize the outer surface of the roller

| Component | Parts | Weight (g) | Weight % |
|---|---|---|---|
| Vibrathane 6060* | 100.00 | 64.19 | 64.19% |
| Simulsol TOIE** | 3.51 | 2.25 | 2.25% |
| Poly bd R-45HT resin*** | 20.47 | 13.14 | 13.14% |
| Poly-G 55-37**** | 30.51 | 19.58 | 19.58% |
| SnO2 | 0.78 | 0.50 | 0.50% |
| Ferric Chloride, anhydrous | 0.40 | 0.26 | 0.257% |
| TIPA | 0.12 | 0.08 | 0.08% |
| TOTAL | 155.79 | 100.00 | 100.00% |

*% NCO V6060 = 3.42
**OH number = 618.00
Equivalent Wt (g/eq) = 90.78
***OH number = 0.83
Equivalent Wt (g/eq) = 1204.82
TIPA Equivalent Wt (g/eq) = 63.70
****OH number = 37.00
Equivalent Wt (g/eq) = 1516.22
Stoichiometry 0.95 (by practice the isocyanate functional group is considered 1; accordingly this stoichiometry defines 100 isocyanate to 95 hydroxyl)
Batch Size (g) 100.00
Nominal Equivalents fraction of TOIE 0.50
Nominal Equivalents fraction of poly bd R-45HT 0.22
Nominal Equivalents fraction of TIPA 0.02
Nominal Equivalents fraction of poly-G 55-37 0.26

The equivalent fraction is the ratio of one ingredient to the total of a functional group supplied. Since the last four materials supply all of the hydroxyl groups, their equivalent fractions total one. Variations in weight percent based on the various raw material lots are anticipated and marginal adjustments are made as is known to those skilled in the art of polyurethane formulating.

This formula, which employs only the tin oxide doped antimony and ferric chloride, provides core bulk resistivity not lower than about 2E7 ohm-cm (measured at −100 volts DC).

The next example provides lower core bulk resistivities, which may be required in certain applications.

EXAMPLE 2

The following formula is processed as described below.

1) Preheat at 75° C.: Vibrathane 6060, poly bd R-45HT, poly-G 55-37 and TIPA
2) Preheat a roller mold at 93° C. (200° F.); may require application of mold release for demolding
3) Mix solution of $FeCl_3$ and Simulsol TOIE with low heat and stirring
4) Degas the V6060 thoroughly; degas the polyol/ $FeCl_3$ mix and the poly bd R45HT
5) Add a shaft to the mold and preheat at 93° C. for~10 minutes to 6) Carefully mix as follows:
   combine V6060, poly bd R-45HT poly-G 55-37 and carbon black/$SnO_2$ then mix;
   add the polyol/$FeCl_3$ mix, TIPA then mix and fill mold
   Note: mixing is done by using a pneumatic mixer with care to avoid aeration of materials during mixing to minimize bubble formation
7) Cure at 93° C.
8) Check curing after 15–20 minutes and demold when hardness is reasonably firm to the touch (record time)
9) Postcure at 93° C. for 1.5 hours to oxidize the outer surface of the roller

| Component | Parts | Weight (g) | Weight % |
|---|---|---|---|
| Vibrathane 6060* | 100.00 | 62.94 | 62.94% |
| Simusol TOIE** | 3.51 | 2.21 | 2.21% |
| Poly bd R-45HT resin*** | 13.97 | 8.80 | 8.80% |
| Poly-G 55-37**** | 38.69 | 24.35 | 24.35% |
| carbon black | 1.59 | 1.00 | 1.00% |
| SnO2 | 0.79 | 0.50 | 0.50% |
| Ferric Chloride, anhydrous | 0.20 | 0.13 | 0.13% |
| TIPA | 0.12 | 0.08 | 0.08% |
| TOTAL | 158.87 | 100.00 | 100.00% |

*% NCO V6060 = 3.42
**OH number = 618.00
Equivalent Wt (g/eq) = 90.78
***OH number = 0.83
Equivalent Wt (g/eq) = 1204.82
TIPA Equivalent Wt (g/eq) = 63.70
****OH number = 37.00
Equivalent Wt (g/eq) = 1516.22
Stoichiometry 0.95
Batch Size (g) 100.00
Nominal Equivalents fraction of TOIE 0.50
Nominal Equivalents fraction of poly bd R-45HT 0.15
Nominal Equivalents fraction of TIPA 0.02
Nominal Equivalents fraction of poly-G 55-37 0.33

This formula provides core bulk resistivity of 8E6 to 8E7 ohm-cm (measured at −100 volts DC).

Stoichiometry is 95 hydroxyl functional groups per 100 isocyanate functional groups to assure adequate completion of the chemical reaction.

The rollers may be characterized by a variety of electrical techniques. A roller is typically cleaned with isopropyl alcohol and painted with conductive carbon or silver paint in a 10 mm strip down the roller. The roller is then placed in a specially made test fixture, which applies a force of 2.0 to 2.4 kg uniformly along the entire length of the roller. The AC resistivity of the roller at 100V is measured both pre and post oxidation cure to ensure that the proper oxidation thickness has been obtained.

Typical desired values for the bulk resistivity of the charge roller core range from 2E6 to 8E7 ohm-cm with the oxidized coating resistivity ranging from 2E7 to 1E12 ohm-cm depending on the specific application of the roller. (All such measurements being at −100 volts DC.) The oxidized coating resistivity can be increased for a specific application with an increase in out-of-mold cure time resulting in an increase of oxidized coating thickness, and overall resistivity of the finished charge roller.

Variations will be apparent and can be anticipated.

We claim:

1. An endless electrophotographic member comprising a body of polycaprolactone ester toluene polyurethane, a first particulate conductive filler, polydiene, and a second particulate filler which catalyzes the oxidation of said polydiene, said member having an outer surface of oxidized polydiene.

2. The electrophotographic member as in claim 1 in which said first conductive filler is tin oxide doped with antimony.

3. The electrophotographic member as in claim 1 in which said second conductive filler is ferric chloride.

4. The electrophotographic member as in claim 1 in which said polydiene is polybutadiene.

5. The electrophotographic member as in claim 2 in which said polydiene is polybutadiene.

6. The electrophotographic member as in claim 3 in which said polydiene is polybutadiene.

7. The electrophotographic member as in claim 2 in which said second conductive filler is ferric chloride.

8. The electrophotographic member as in claim 7 in which said polydiene is polybutadiene.

9. An endless electrophotographic member comprising a body of the polymerized product of polycaprolactone ester toluene-dusocyanate and polyether polyols, a first particulate conductive filler, a polydiene and a second particulate filler which catalyzes the oxidation of said polydiene; said member having an outer surface of oxidized polydiene.

10. The electrophotographic member as in claim 9 in which said first conductive filler is tin oxide and doped with antimony.

11. The electrophotographic member as in claim 10 in which said member also comprises carbon black as a particulate conductive filler.

12. The electrophotographic member as in claim 9 in which said second conductive filler is ferric chloride.

13. The electrophotographic member as in claim 10 in which said second conductive filler is ferric chloride.

14. The electrophotographic member as in claim 11 in which said second conductive filler is ferric chloride.

15. The electrophotographic member as in claim 9 in which said polydiene is polybutadiene.

16. The electrophotographic member as in claim 10 in which polydiene is polybutadiene.

17. The electrophotographic member as in claim 11 in which polydiene is polybutadiene.

18. The electrophotographic member as in claim 12 in which polydiene is polybutadiene.

19. The electrophotographic member as in claim 13 in which polydiene is polybutadiene.

20. The electrophotographic member as in claim 14 in which polydiene is polybutadiene.

21. The electrophotographic member as in claim 9 in which said polyether polyols comprise polyether triols and polyether diols.

22. The electrophotographic member as in claim 10 in which said polyether polyols comprise polyether triols and polyether diols.

23. The ejectrophotographic member as in claim 11 in which said polyether polyols comprise polyether triols and polyether diols.

24. The electrophotographic member as in claim 12 in which said polyether polyols comprise polyether triols and polyether diols.

25. The electrophotographic member as in claim 13 in which said polyether polyols comprise polyether triols and polyether diols.

26. The electrophotographic member as in claim 14 in which said polyether polyols comprise polyether triols and polyether diols.

27. The electrophotographic member as in claim 15 in which said polyether polyols comprise polyether triols and polyether diols.

28. The electrophotographic member as in claim 16 in which said polyether polyols comprise polyether triols and polyether diols.

29. The electrophotographic member as in claim 17 in which said polyether polyols comprise polyether triols and polyether diols.

30. The electrophotographic member as in claim 18 in which said polyether polyols comprise polyether triols and polyether diols.

31. The electrophotographic member as in claim 19 in which said polyether polyols comprise polyether triols and polyether diols.

32. The electrophotographic member as in claim 20 in which said polyether polyols comprise polyether triols and polyether diols.

* * * * *